(12) United States Patent
Horii

(10) Patent No.: US 12,291,844 B2
(45) Date of Patent: May 6, 2025

(54) FUEL SUPPLY GUIDE AND WORKING MACHINE

(71) Applicant: KUBOTA CORPORATION, Osaka (JP)

(72) Inventor: Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 74 days.

(21) Appl. No.: 18/080,364

(22) Filed: Dec. 13, 2022

(65) Prior Publication Data

US 2023/0114311 A1  Apr. 13, 2023

Related U.S. Application Data

(63) Continuation of application No. PCT/JP2021/047937, filed on Dec. 23, 2021.

(30) Foreign Application Priority Data

Jan. 27, 2021 (JP) .................................. 2021-011440

(51) Int. Cl.
*B60K 15/04* (2006.01)
*B60K 15/03* (2006.01)
*E02F 9/08* (2006.01)

(52) U.S. Cl.
CPC ............ *E02F 9/0883* (2013.01); *B60K 15/04* (2013.01); *B60K 2015/03328* (2013.01)

(58) Field of Classification Search
CPC ................................ E02F 9/0883; B60K 15/03
See application file for complete search history.

(56) References Cited

U.S. PATENT DOCUMENTS 4,919,301 A * 4/1990 Miller .................. B67D 7/0288
220/284
2004/0238707 A1* 12/2004 Yoakum, Jr. ............ B60R 11/06
248/311.2
(Continued)

FOREIGN PATENT DOCUMENTS

JP    52-113941         8/1977
JP    7048661 Y2      10/1982
(Continued)

OTHER PUBLICATIONS

Official Communication issued in International Bureau of WIPO Patent Application No. PCT/JP2021/047937, dated Mar. 22, 2022, along with an English translation thereof.
(Continued)

*Primary Examiner* — Don M Anderson
(74) *Attorney, Agent, or Firm* — Greenblum & Bernstein, P.L.C.

(57) ABSTRACT

To ease work of transferring a fuel from a fuel supply tank to a fuel tank, a fuel supply guide to be used to supply the fuel by using the fuel supply tank to the fuel tank having a tank body for storing the fuel and a fuel supply port on the upper side of the tank body includes a support member provided on an upper portion of the fuel tank, and a body member projecting from the support member in a direction away from the fuel supply port as the body member extends upward and projecting higher than the fuel supply port. The body member is capable of receiving the fuel supply tank by an upper portion thereof to support the fuel supply tank.

11 Claims, 15 Drawing Sheets

(56) References Cited

U.S. PATENT DOCUMENTS

| | | |
|---|---|---|
| 2009/0101657 A1 | 4/2009 | Kunihiko |
| 2018/0297455 A1* | 10/2018 | Hale ................... B60J 5/0476 |
| 2019/0283573 A1* | 9/2019 | Lin .................... B60K 15/063 |
| 2019/0338493 A1 | 11/2019 | Horii |

FOREIGN PATENT DOCUMENTS

| | | |
|---|---|---|
| JP | 2008137528 A | 6/2008 |
| JP | 2012 056344 A | 3/2012 |
| JP | 2013 103700 A | 5/2013 |
| JP | 2017 093370 A | 6/2017 |
| JP | 2018 061478 A | 4/2018 |
| JP | 2019 004711 A | 1/2019 |
| JP | 2019 019570 A | 2/2019 |
| WO | 2006/123756 A1 | 11/2006 |

OTHER PUBLICATIONS

Extended European Search Report issued in Corresponding EP Patent Application No. 21923246.9, dated Jan. 8, 2025.

\* cited by examiner

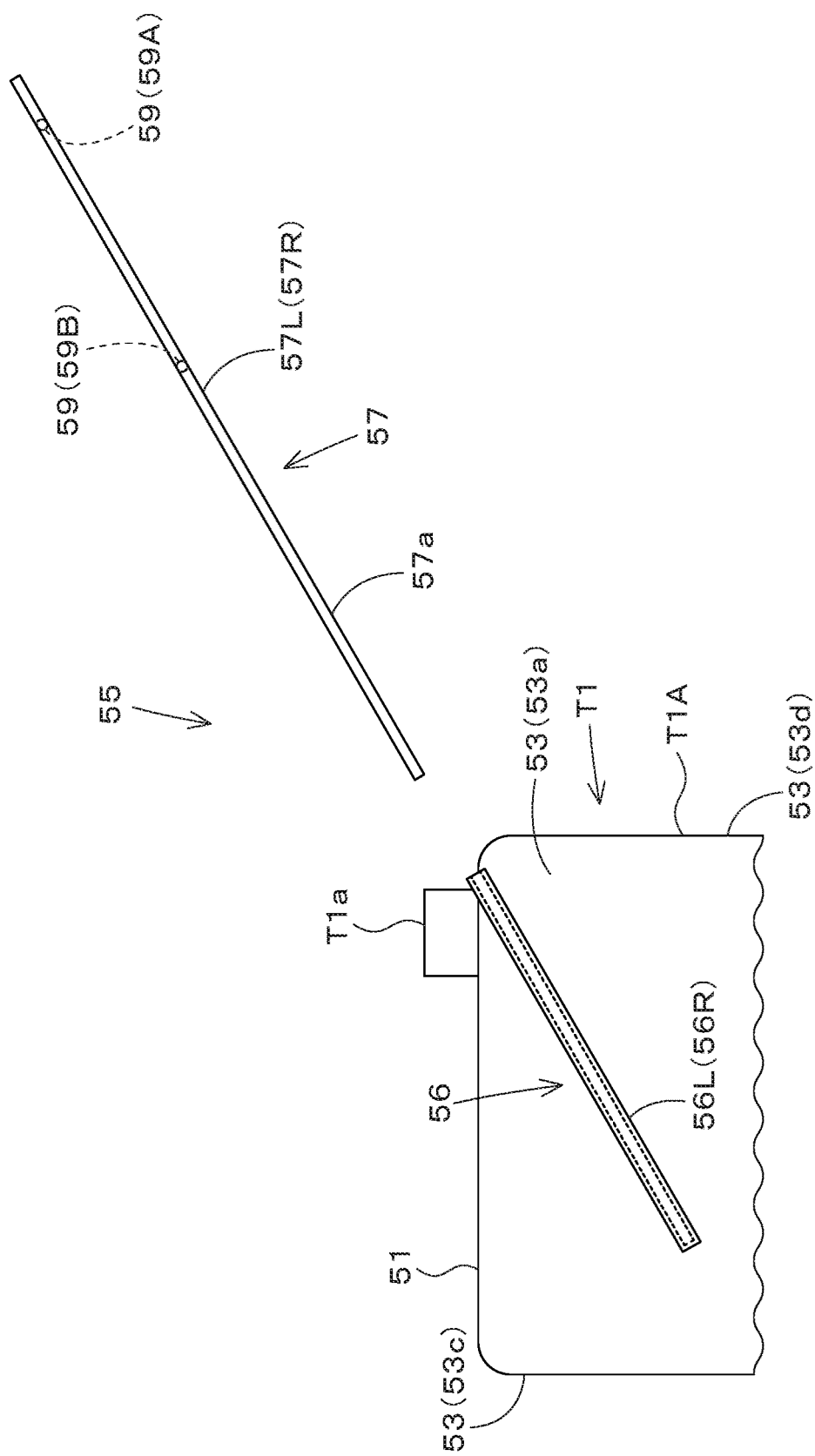

FUEL SUPPLY GUIDE AND WORKING MACHINE

CROSS REFERENCE TO RELATED APPLICATIONS

This application is a continuation application of International Application No. PCT/JP2021/047937, filed on Dec. 23, 2021, which claims the benefit of priority to Japanese Patent Application No. 2021-011440, filed on Jan. 27, 2021. The entire contents of each of these applications are hereby incorporated herein by reference.

BACKGROUND OF THE INVENTION

1. Field of the Invention

The present invention relates to a fuel supply guide and a working machine including the fuel supply guide.

2. Description of the Related Art

The working machine disclosed in Japanese Unexamined Patent Application Publication No. 2019-19570 has been known.

The working machine disclosed in Japanese Unexamined Patent Application Publication No. 2019-19570 includes a fuel tank mounted on a machine body. The fuel tank has a tank body for storing a fuel, and a fuel supply port provided on the upper side of the tank body.

SUMMARY OF THE INVENTION

Meanwhile, when a fuel supply tank is used to supply a fuel to a fuel tank, work of transferring the fuel while lifting the fuel supply tank that is heavy is hard work.

Preferred embodiments of the present invention each eases work of transferring a fuel from a fuel supply tank to a fuel tank.

In one aspect of the present invention, a fuel supply guide to be used to supply a fuel by using a fuel supply tank to a fuel tank that includes a tank body for storing the fuel and a fuel supply port on an upper side of the tank body. The fuel supply guide includes a support member provided on an upper portion of the fuel tank; and a body member projecting from the support member in a direction away from the fuel supply port as the body member extends upward and projecting higher than the fuel supply port. The body member is capable of receiving the fuel supply tank by an upper portion thereof to supply the fuel supply tank.

The body member may be attachable to and detachable from the support member.

The support member may include a first support member closer to a first vertical surface of the fuel tank extending in an up-down direction, and a second support member closer to a second vertical surface of the fuel tank opposite to the first vertical surface. The body member may include a first member inserted into the first support member in an insertable/extractable manner, a second member inserted into the second support member in an insertable/extractable manner, and a coupling member to couple the first member and the second member to each other.

The body member may be supported by the support member to be shiftable between a usage position for placing the fuel supply tank thereon and a storage position in which the body member faces a surface of the fuel tank extending in an up-down direction.

The support member may have a guide groove along a vertical surface of the fuel tank extending in the up-down direction. The guide groove may guide the body member to be shiftable between the usage position and the storage position.

The body member may include a main member formed of a long material, a first engagement portion provided at an intermediate portion in a longitudinal direction of the main member, and a second engagement portion provided close to an end in the longitudinal direction of the main member. The body member may be disposed with the longitudinal direction of the main member coinciding with the up-down direction such that the second engagement portion is positioned below the first engagement portion in a state of being in the storage position. The guide groove may have a first groove to guide the first engagement portion and the second engagement portion to be movable in the up-down direction, and a second groove branched from an intermediate portion of the first groove to guide the second engagement portion. The main member may be shifted from the storage position to the usage position by moving the first engagement portion and the second engagement portion upward along the first groove, and then moving the second engagement portion along the second groove by rotating the main member around the first engagement portion.

The guide groove may have a third groove to hold the main member in the usage position as a result of the second engagement portion being fitted to the third groove when the main member is in the usage position.

The body member may be supported by the support member to be shiftable between a usage position for placing the fuel supply tank thereon and a storage position in which the body member is in a position at an upper portion of the fuel tank and extends in a horizontal direction.

The fuel supply guide may include a lock member to lock the body member. The support member may be disposed at an upper portion of the fuel tank in the horizontal direction. The body member may include a pivotally supported portion pivotably supported by one end portion of the support member in the horizontal direction. The body member may be shiftable between the usage position and the storage position by being rotated around the pivotally supported portion. The lock member may be bridged over the body member and the support member and locks the body member in the usage position when the body member is in the usage position.

The support member may have a first locking groove formed to be spaced from the pivotally supported portion toward another end of the support member in the horizontal direction, a second locking groove formed to be spaced from the first locking groove toward the other end, and a third locking groove formed to be spaced from the second locking groove toward the other end. The body member may include a first locking portion provided at an end portion thereof opposite to an end portion thereof provided with the pivotally supported portion. The lock member may include a pivotally attached portion provided closer to one end thereof and pivotally attached to an intermediate portion of the body member, and a second locking portion provided closer to another end thereof and to be fitted to the first locking groove to lock the body member in the usage position when the body member is in the usage position. When the body member is in the storage position, the pivotally attached portion may be fitted to the first locking groove, the first locking portion may be fitted to the second locking groove, and the second locking portion may be fitted to the third locking groove.

A working machine according to one aspect of the present invention includes the fuel supply guide.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6 is an exploded side view of the fuel supply guide according to the first embodiment.

DETAILED DESCRIPTION OF THE PREFERRED EMBODIMENTS

Figure 1:
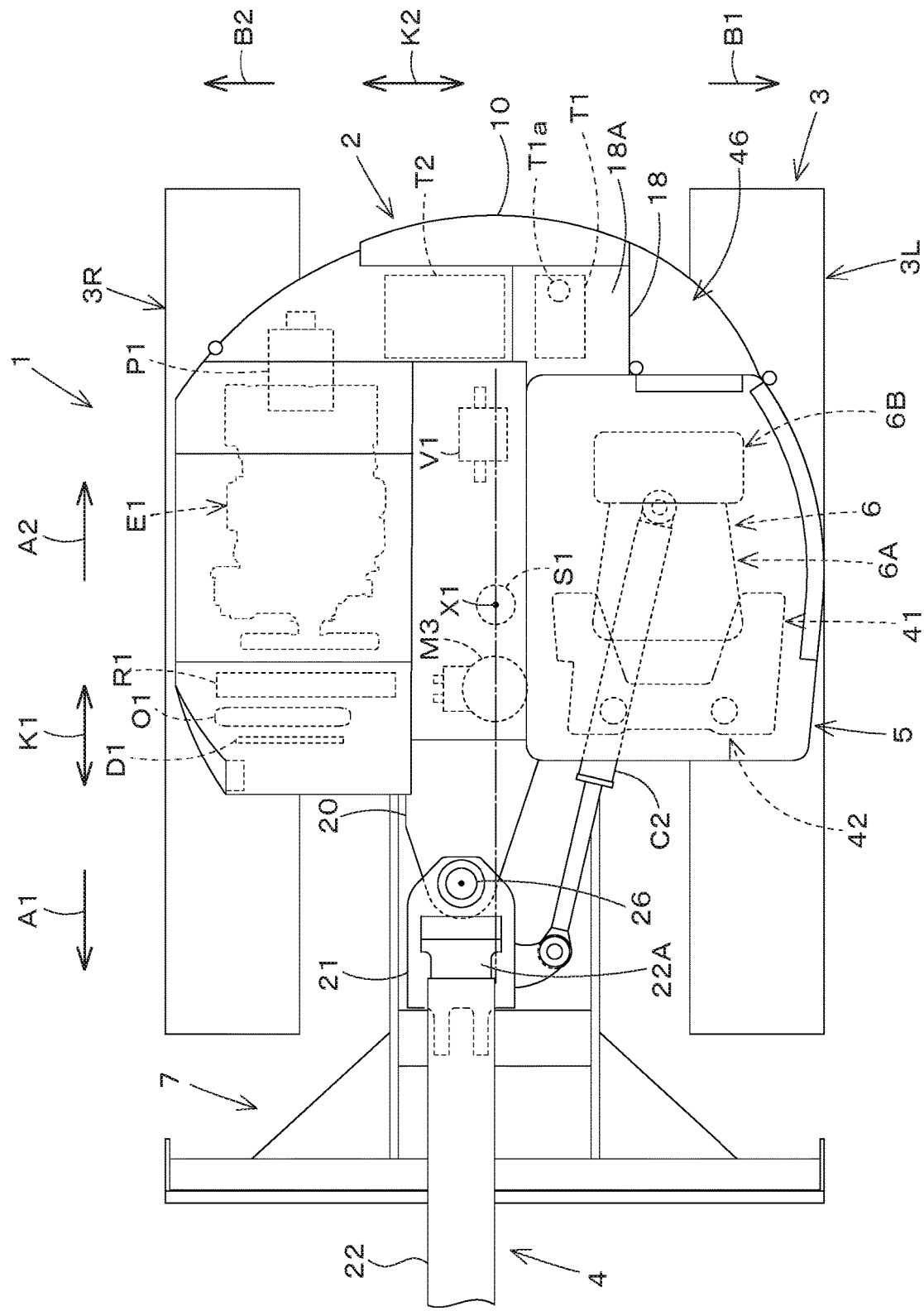
FIG. 1 is a schematic plan view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment according to the present invention will be described with reference to the drawings, as appropriate.

Figure 2:
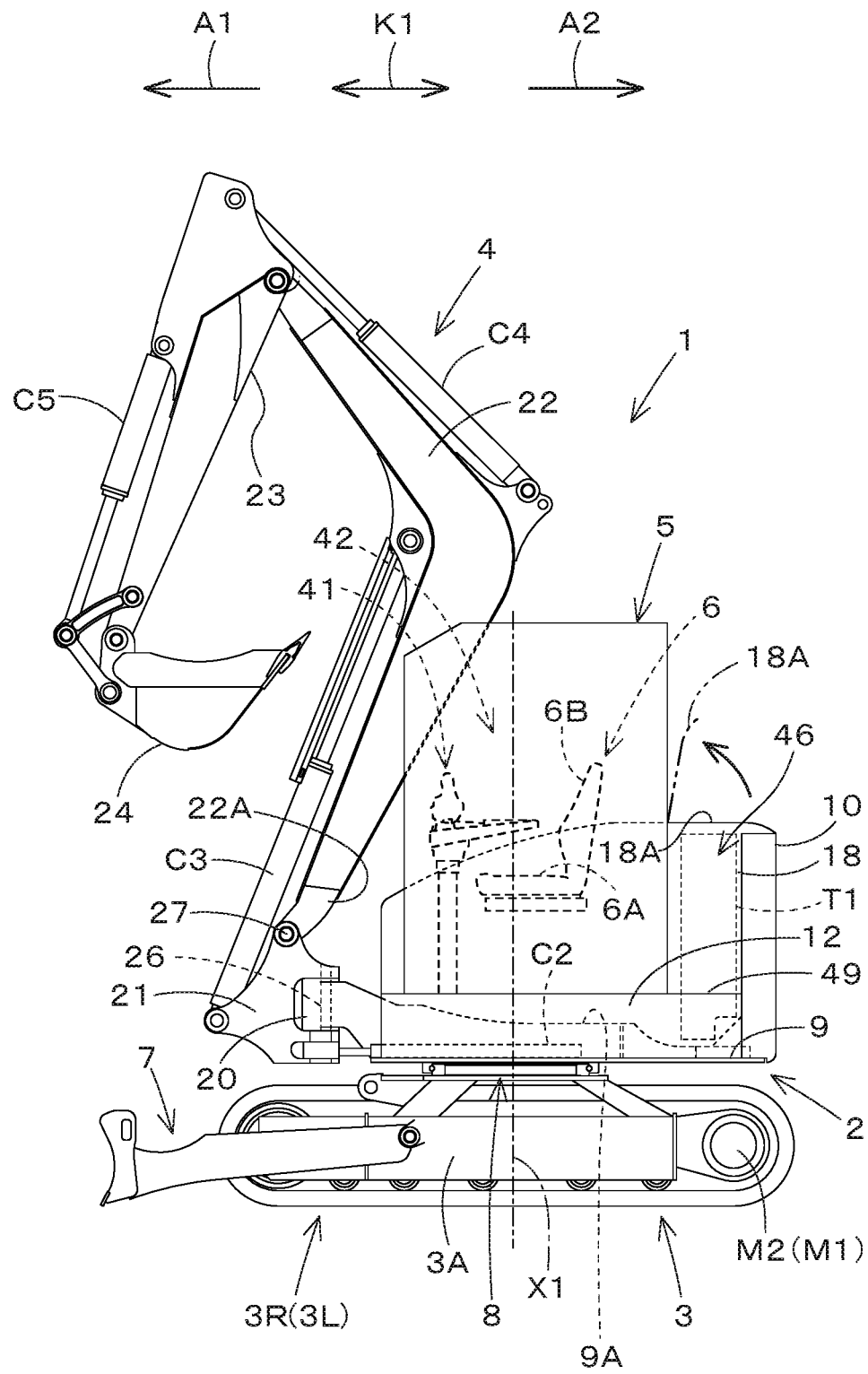
FIG. 2 is a schematic side view of the working machine.
Figure 3:
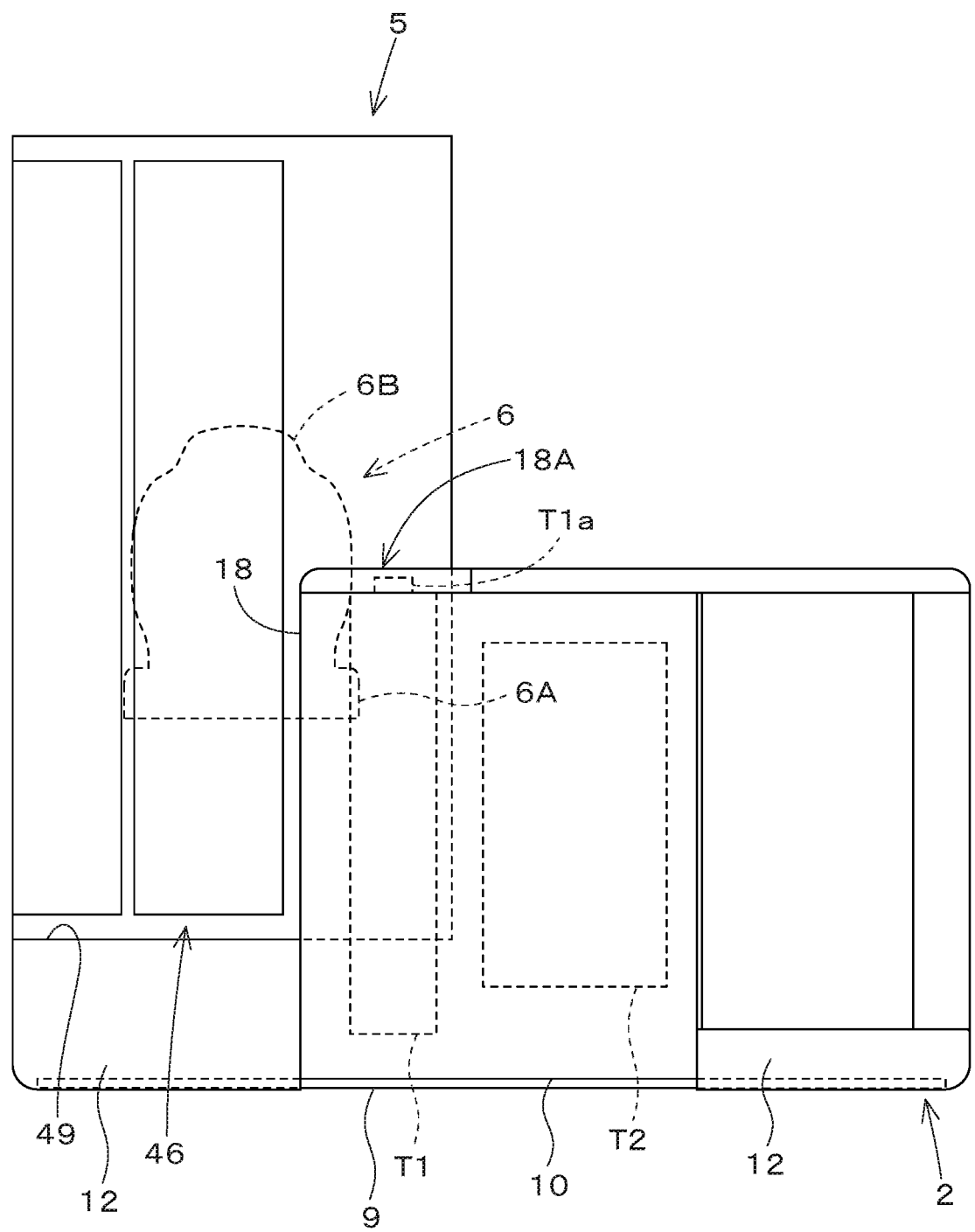
FIG. 3 is a schematic rear view of the working machine.

FIG. 1 is a schematic plan view illustrating an overall configuration of a working machine 1 according to the present embodiment. FIG. 2 is a schematic side view of the working machine 1. FIG. 3 is a rear view of the working machine 1. In the present embodiment, a backhoe, which is a swiveling work machine, is presented as an example of the working machine 1.

As illustrated in FIG. 1 and FIG. 2, the working machine 1 includes a machine body (swivel base) 2, a traveling device 3, and a working device 4. A cabin 5 is mounted on the machine body 2. An operator's seat (seat) 6 on which a driver (operator) is to sit is provided in the interior of the cabin 5. In other words, the operator's seat 6 is mounted on the machine body 2, and the cabin 5 surrounds the operator's seat 6. The operator's seat 6 includes a seat portion 6A that is a portion for a driver to sit thereon, and a back portion 6B that is a portion for receiving the back of the driver.

In the present embodiment, the direction (the arrow A1 direction in FIG. 1 and FIG. 2) toward the front of a driver (operator) sitting on the operator's seat 6 of the working machine 1 will be described as forward, the direction (the arrow A2 direction in FIG. 1 and FIG. 2) toward the rear of the driver will be described as rearward, the arrow K1 direction in FIG. 1 and FIG. 2 will be described as the front-rear direction, leftward (the arrow B1 direction in FIG. 1) of the driver will be described as leftward, and rightward (the arrow B2 direction in FIG. 1) of the driver will be described as rightward.

As illustrated in FIG. 1, the horizontal direction, which is a direction orthogonal to the front-rear direction K1, will be described as a machine-body width direction K2 (the width direction of the machine body 2). A direction from a central portion of the machine body 2 in the width direction toward a right portion or a left portion thereof will be described as machine-body-outward (outward in the machine-body width direction K2). In other words, machine-body-outward is a direction that is in the machine-body width direction K2 and that is away from the center of the machine body 2 in the width direction. A direction opposite to the machine-body-outward will be described as machine-body-inward (inward in the machine-body width direction K2). In other words, machine-body-inward is a direction that is in the machine-body width direction K2 and that is toward the center of the machine body 2 in the width direction.

As illustrated in FIG. 1 and FIG. 2, the traveling device 3 is a crawler traveling device that supports the machine body 2 so as to be capable of traveling. The traveling device 3 includes a travel frame 3A, a first traveling device 3L provided leftward of the travel frame 3A, and a second traveling device 3R provided rightward of the travel frame 3A. The first traveling device 3L is driven by a first traveling motor M1, and the second traveling device 3R is driven by a second traveling motor M2. A dozer device 7 is mounted on a front portion of the traveling device 3.

As illustrated in FIG. 2, the machine body 2 is supported on the travel frame 3A via a swivel bearing 8 so as to be capable of swiveling around a swiveling axis X1. The machine body 2 is driven to swivel by a swivel motor M3. The machine body 2 includes a base (hereinafter referred to as the swiveling base) 9 supported by the swivel bearing 8 to be capable of swiveling around the swiveling axis X1. The swiveling base 9 is formed of a steel sheet or the like and constitutes a bottom portion of the machine body 2. A vertical rib 9A, which is a reinforcing member, is provided from a front portion to a rear portion of the upper surface of the swiveling base 9. In addition to the vertical rib 9A, a support member or the like that supports a mounted object, such as a device mounted on the machine body 2, is provided on the swiveling base 9. A swiveling frame that serves as the framework of the machine body 2 is thereby formed. The periphery of the swiveling frame in the horizontal direction is covered by a swiveling cover 12.

As illustrated in FIG. 1 and FIG. 2, a fuel tank T1 for storing a fuel of a prime mover E1 and a hydraulic fluid tank T2 for storing a hydraulic fluid are disposed adjacent to each other in the machine-body width direction K2 on a rear portion of the machine body 2.

The fuel tank T1 is disposed rearward of the cabin 5 and the operator's seat 6. The fuel tank T1 is attached to an attachment member fixed at a lower portion thereof to the swiveling base 9, and projects upward from the swiveling base 9 (a lower portion of the machine body 2). A weight 10 is disposed rearward of the fuel tank T1 and the hydraulic fluid tank T2 to face the fuel tank T1 and the hydraulic fluid tank T2 in the front-rear direction K1. The upper end of the fuel tank T1 is at a height position that is substantially identical to the height position of the upper end of the weight 10. The fuel tank T1 has a shape (vertically elongated shape) whose height is relatively high and sectional area in the horizontal direction is relatively small. Specifically, the fuel tank T1 has a shape whose height in the up-down direction is larger than the width thereof in the machine-body width direction K2 and the width thereof in the front-rear direction.

As illustrated in FIG. 1, FIG. 2, and FIG. 3, a space 46 is provided rearward of the cabin 5. The space 46 is formed, rearward of the cabin 5, machine-body-outward. The space 46 is defined by the left side surface of a cover member 18 covering the fuel tank T1, the left side surface of the weight 10, the back surface of the cabin 5, and a step (floor surface) 49 forming the lower surface of the space 46. The space 46 is open upward, rearward, and leftward.

As illustrated in FIG. 2, the upper wall of the cover member 18 includes an openable lid 18A that openably closes a housing space for the fuel tank T1. The openable lid 18A is pivotably supported at a front end portion thereof by a hinge or the like and is capable of opening a portion above the fuel tank T1 (a portion above the housing space for the fuel tank T1) by being upwardly swung around the front end portion as indicated by the two-dot-chain line in FIG. 2.

The step 49 is provided at a position near a lower end portion of the cabin 5 and forms the upper surface of the machine body 2 to allow an operator to step thereon. The fuel tank T1 is disposed in the vicinity of the step 49. Therefore, when supplying a fuel to the fuel tank T1, it is possible for an operator to perform work of supplying the fuel to the fuel tank T1 in a state in which the openable lid 18A of the cover member 18 is opened and in which the operator is on the step 49.

As illustrated in FIG. 1, the cabin 5 is mounted on one side portion (left side portion) of the machine body 2 in the width direction K2. The prime mover E1 is mounted on the other side portion (right side portion) of the machine body 2 in the width direction K2. The prime mover E1 is a diesel engine. The prime mover E1 may be a gasoline engine and may be of a hybrid type including an engine and an electric motor.

A rear portion of the prime mover E1 is provided with a hydraulic pump P1. The hydraulic pump P1 is driven by the prime mover E1 to pressurize and deliver a hydraulic fluid that is to be used for a hydraulic driver. A radiator R1 that cools cooling water of the prime mover E1, an oil cooler O1 that cools a hydraulic fluid, and a condenser D1 that cools refrigerant of an air conditioning apparatus (air-conditioner) mounted on the working machine 1 are disposed forward of the prime mover E1.

A swivel joint S1 is provided at the position of the swiveling axis X1. The swivel joint S1 is a rotating joint (rotary joint) that causes a hydraulic fluid to flow between a hydraulic machine on the machine body 2 and a hydraulic machine on the traveling device 3. A control valve V1 is disposed rearward of the swivel joint S1. The control valve V1 is a hydraulic machine in which control valves that control hydraulic actuators of a hydraulic cylinder, a hydraulic motor, and the like mounted on the working machine 1 are integrated.

As illustrated in FIG. 1 and FIG. 2, a swing bracket 21 is attached to a front portion of a support bracket 20 via a swing shaft 26 so as to be swingable around a vertical axis. The working device 4 is attached to the swing bracket 21.

As illustrated in FIG. 2, the working device 4 includes a boom 22, an arm 23, and a bucket (working tool) 24. A base portion 22A of the boom 22 is pivotally attached to an upper portion of the swing bracket 21 via a boom pivot 27 so as to be rotatable around a lateral axis (an axis extending in the machine-body width direction K2).

The arm 23 is pivotally attached to the distal end of the boom 22 so as to be rotatable around the lateral axis. The bucket 24 is provided at the distal end of the arm 23 to be capable of shoveling and dumping. Shoveling is an operation of swinging the bucket 24 in a direction toward the boom 22 and is, for example, an operation of scooping earth and sand, or the like. Dumping is an operation of swinging the bucket 24 in a direction away from the boom 22 and is, for example, an operation of dropping (discharging) scooped earth and sand, or the like.

Instead of or in addition to the bucket 24, a different working tool (hydraulic attachment) drivable by a hydraulic actuator can be mounted on the working machine 1. Examples of the different working tool are a hydraulic breaker, a hydraulic crusher, an angle broom, an earth auger, a pallet fork, a sweeper, a mower, a snow blower, and the like.

The swing bracket 21 can be swung by the extension and contraction of a swing cylinder C2 included in the machine body 2. The boom 22 can be swung by the extension and contraction of a boom cylinder C3. The arm 23 can be swung by the extension and contraction of an arm cylinder C4. The bucket 24 can be caused to shovel and dump by the extension and contraction of a bucket cylinder (working tool cylinder) C5. The swing cylinder C2, the boom cylinder C3, the arm cylinder C4, and the bucket cylinder C5 are each constituted by a hydraulic cylinder.

A manipulator 41 is provided in the interior of the cabin 5. The manipulator 41 is provided forward of the operator's seat 6. An operation unit 42 for operating (manipulating the machine body 2, the traveling device 3, the working device 4, the swing bracket 21, and the like) the working machine 1 includes the operator's seat 6 and the manipulator 41.

Figure 4:
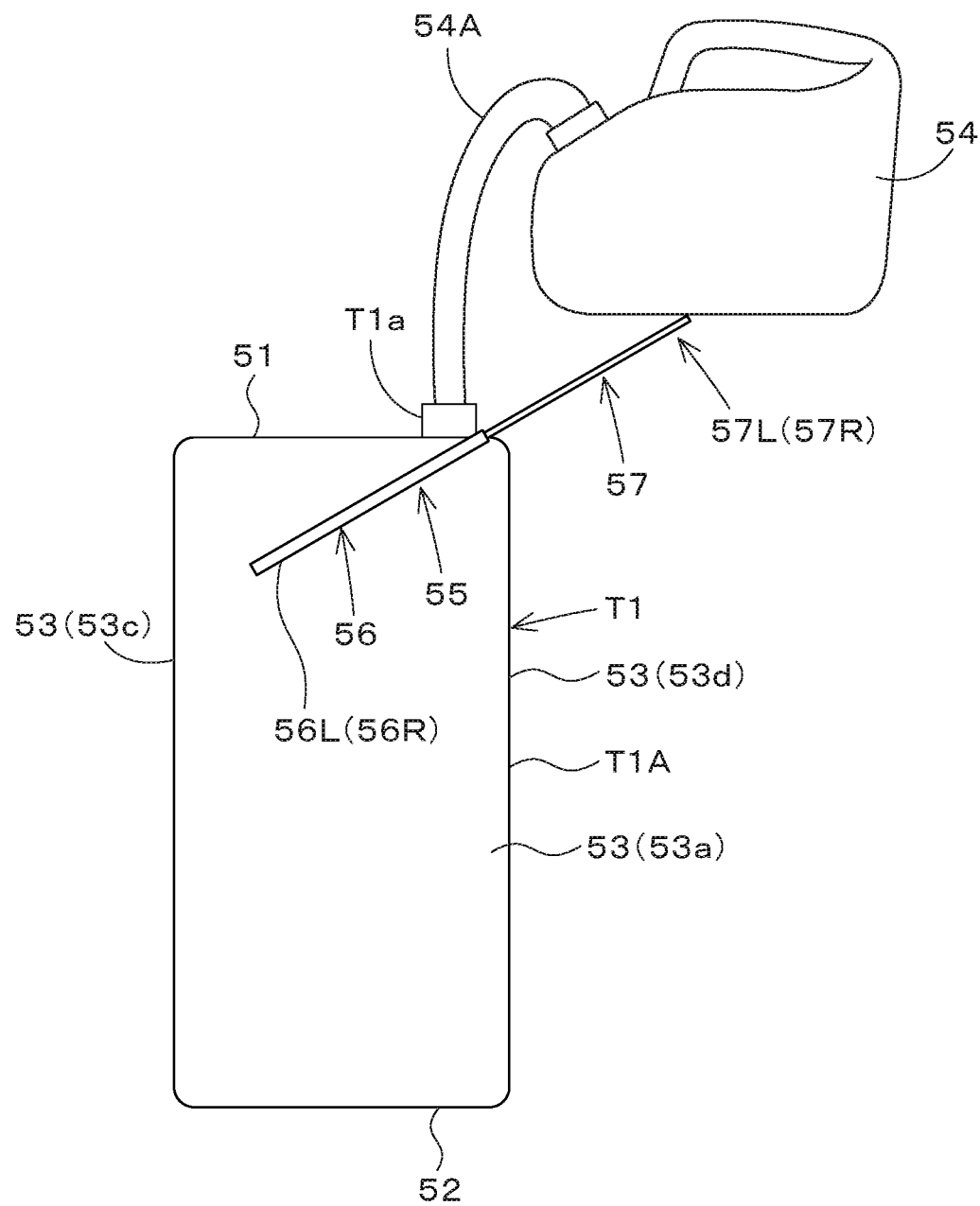
FIG. 4 is a side view of a fuel supply guide according to a first embodiment.
Figure 5:
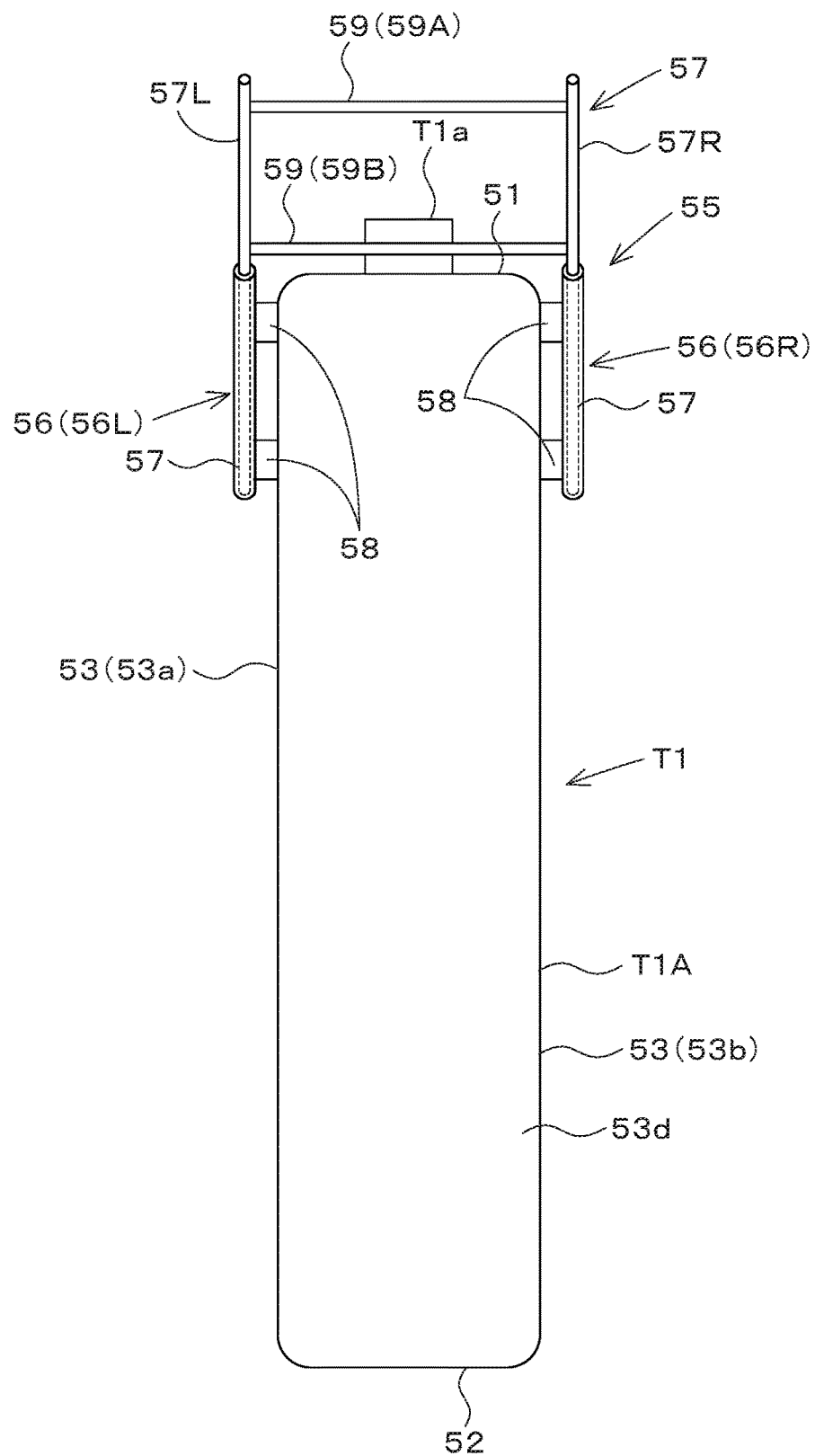
FIG. 5 is a rear view of the fuel supply guide according to the first embodiment.

As illustrated in FIG. 4 and FIG. 5, the fuel tank T1 includes a tank body T1A for storing a fuel, and a fuel supply port T1a for inputting the fuel into the tank body T1A. The tank body T1A has a quadrangular column-like outer shape and has an upper surface 51, a bottom surface 52, and four vertical surfaces 53 (a first vertical surface 53a, a second vertical surface 53b, a third vertical surface 53c, and a fourth vertical surface 53d) extending in the up-down direction. In the present embodiment, the first vertical surface 53a is the left surface of the tank body T1A, the second vertical surface 53b is the right surface of the tank body T1A, the third vertical surface 53c is the front surface of the tank body T1A, and the fourth vertical surface 53d is the rear surface of the tank body T1A. The fuel supply port T1a is provided on the upper surface 51 of the tank body T1A. In the present embodiment, the fuel supply port T1a is provided at a central portion of the upper surface 51 of the tank body T1A in the machine-body width direction K2 to be rearward from a central portion of the upper surface 51 in the front-rear direction.

As illustrated in FIG. 4, a fuel supply guide 55 that is to be used to supply a fuel to the fuel tank T1 by using a fuel supply tank 54 (for example, a ferry can) is mounted in the present embodiment. The fuel supply guide 55 is used to reduce the operator's load of work of transferring a fuel from the fuel supply tank 54 to the fuel tank T1 when the fuel is to be supplied to the fuel tank T1 by using the fuel supply tank 54. The fuel supply guide 55 is provided on an upper portion of the fuel tank T1 and is used when a fuel is supplied to the fuel tank T1 from above by lifting the fuel supply tank 54 above the fuel tank T1.

FIG. 4, FIG. 5, and FIG. 6 illustrate a first embodiment of the fuel supply guide 55.

As illustrated in FIG. 4 and FIG. 5, the fuel supply guide 55 includes a support member 56 provided on an upper portion of the fuel tank T1, and a body member 57 projecting in an inclined direction in which the body member 57 is shifted in a direction away from the fuel supply port T1a as the body member 57 extends upward from the support member 56.

As illustrated in FIG. 4, the body member 57 projects higher than the fuel supply port T1a and is capable of receiving the fuel supply tank 54 by an upper portion thereof and supporting the fuel supply tank 54. It is thus possible, when inserting a distal end portion of a fuel supply nozzle 54A connected to the fuel supply tank 54 into the fuel supply port T1a with one hand, to place the fuel supply tank 54 on the upper portion of the body member 57 and support the fuel supply tank 54 with the other hand while the weight of the fuel supply tank 54 is received by the fuel supply guide 55. After the distal end portion of the fuel supply nozzle 54A is inserted, the side of the fuel supply port T1a of the fuel supply tank 54 is tilted downward while the weight of the fuel supply tank 54 is received by the fuel supply guide 55, to thereby supply a fuel from the fuel supply tank 54 to the fuel tank T1. Consequently, it is possible to reduce the operator's load of work of transferring the fuel from the fuel supply tank 54 to the fuel tank T1. That is, it is also possible to reduce an operator's load during insertion of the distal end portion of the fuel supply nozzle 54A into the fuel supply port T1a and during supplying of the fuel.

As illustrated in FIG. 5 and FIG. 6, the support member 56 includes a first support member 56L closer to the first vertical surface 53a, and a second support member 56R closer to the second vertical surface 53b opposite to the first vertical surface 53a. The first support member 56L and the second support member 56R are each formed of a cylinder member having a bottomed cylindrical shape closed at one end thereof in the axial direction and opening at the other end thereof. The first support member 56L is disposed leftward of an upper portion of the first vertical surface 53a, and the second support member 56R is disposed rightward of an upper portion of the second vertical surface 53b. The support member 56 (the first support member 56L and the second support member 56R) is inclined to shift upward as the support member 56 extends rearward such that the opening side thereof is the upper side. The support member 56 (the first support member 56L and the second support member 56R) is disposed such that an upper portion thereof is at a position that is forward of the fourth vertical surface 53d (rear surface) of the fuel tank T1 and that corresponds to the fuel supply port T1a in a side view.

The first support member 56L and the second support member 56R (support member 56) are attached to and supported by the fuel tank T1 or a member around the fuel tank T1. For example, FIG. 5 illustrates an example in which the first support member 56L and the second support member 56R are attached to a bracket member 58 fixed to the fuel tank T1. The first support member 56L and the second support member 56R are, however, not limited thereto and may be attached to a member on the machine body 2, for example, to a bracket member extending from the cover member 18, the weight 10, the swiveling frame, or the like.

As illustrated in FIG. 5 and FIG. 6, the body member 57 includes a first member 57L, a second member 57R, and a coupling member 59. In the present embodiment, the first member 57L, the second member 57R, and the coupling member 59 are each formed of a bar member (round bar member). The first member 57L, the second member 57R, and the coupling member 59 are not each limited to a bar member. The first member 57L and the second member 57R are disposed parallel to each other with a space therebetween. A distance between the axes of the first member 57L and the second member 57R coincides with a distance between the axes of the first support member 56L and the second support member 56R. The coupling member 59 includes a first coupling rod 59A that couples one end portions of the first support member 56L and the second support member 56R to each other, and a second coupling rod 59B that couples intermediate portions of the first support member 56L and the second support member 56R to each other.

As illustrated in FIG. 5, a portion of the first member 57L on the other end side in the axial direction is inserted into the first support member 56L. A portion of the second member 57R on the other end side in the axial direction is inserted into the second support member 56R. The portion of each of the first member 57L and the second member 57R on the other end side in the axial direction constitutes an insertion portion 57a inserted into the support member 56 in an insertable/extractable manner. The body member 57 can be attached to and detached from the support member 56 by inserting and extracting the insertion portion 57a into/from the support member 56. When the fuel supply tank 54 is to be placed on the body member 57, the fuel supply tank 54 is placed on the first coupling rod 59A. The first coupling rod 59A thus constitutes a placement portion for placing the fuel supply tank 54 thereon.

The body member 57 of the fuel supply guide 55 according to the first embodiment is mounted on the support member 56 when a fuel is to be supplied to the fuel tank T1 by using the fuel supply tank 54. When a fuel is not to be supplied to the fuel tank T1, the body member 57 can be dismounted from the support member 56 and stored in a storage space in the vicinity of the fuel tank T1.

Each of the first member 57L and the second member 57R is not limited to a round bar and may be formed of a square bar or a plate material. In this case, the first support member 56L and the second support member 56R are formed in cylindrical shapes corresponding to the sectional shapes of the first member 57L and the second member 57R, respectively.

FIG. 7A, FIG. 7B, FIG. 8, and FIG. 9 illustrate a second embodiment of the fuel supply guide 55.

Figure 7A:
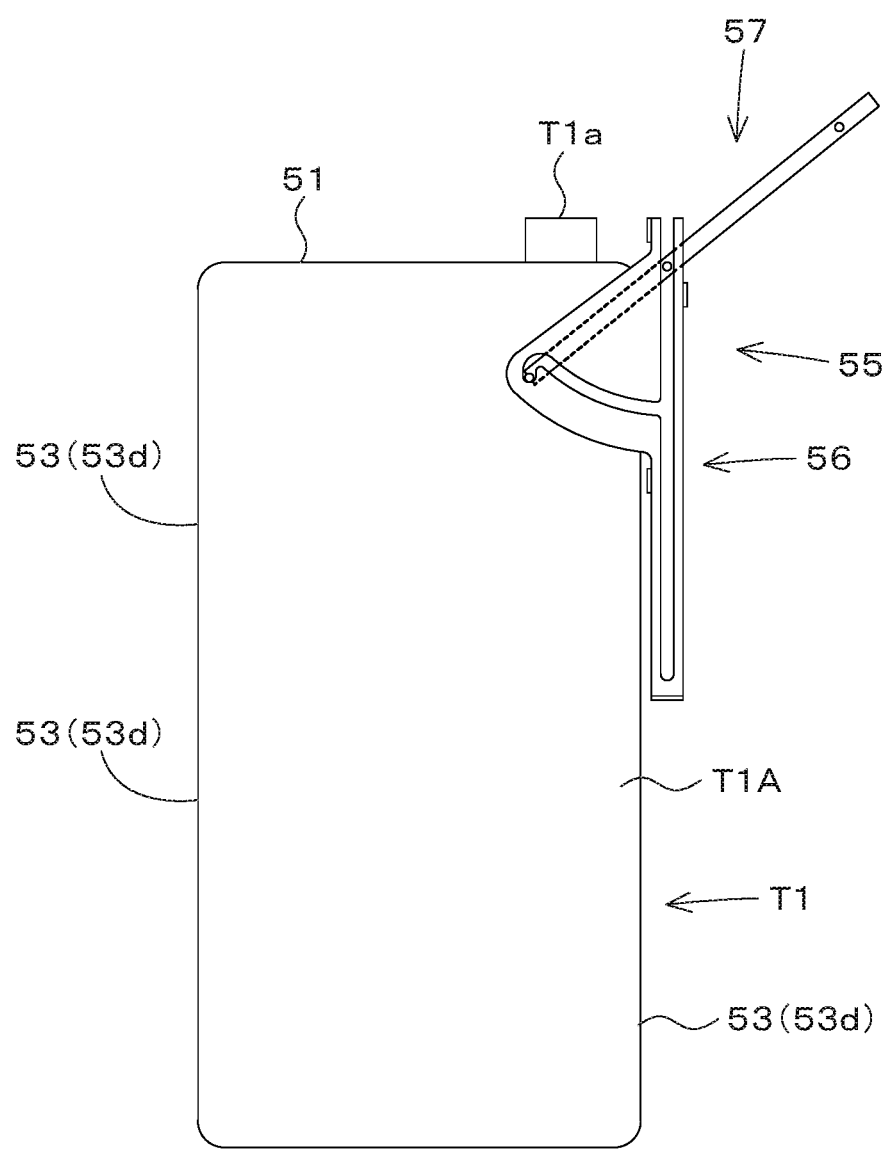
FIG. 7A is a side view of a fuel supply guide in a usage position according to a second embodiment.
Figure 7B:
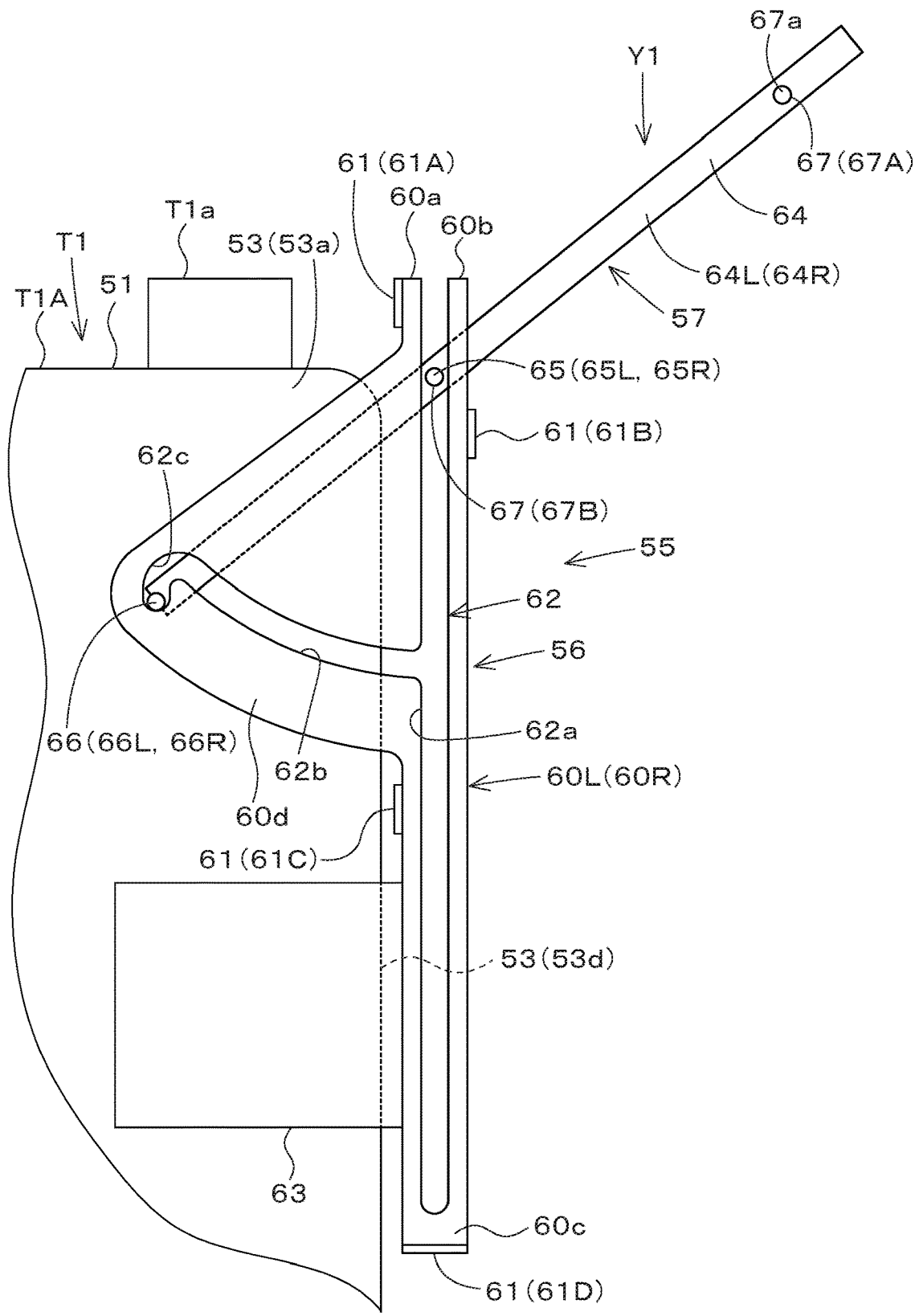
FIG. 7B is an enlarged side view of the fuel supply guide in the usage position according to the second embodiment.
Figure 8:
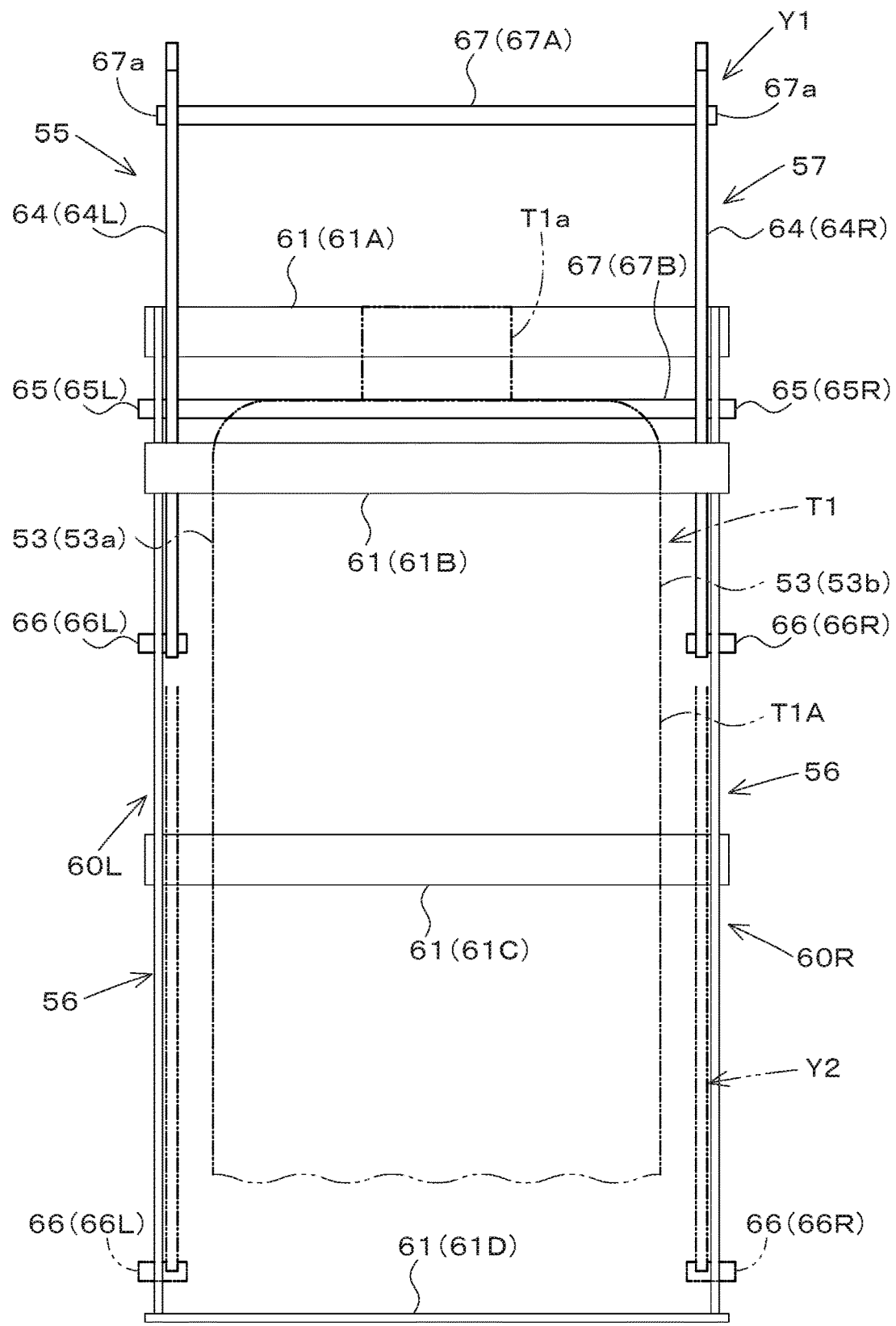
FIG. 8 is a rear view of the fuel supply guide in the usage position according to the second embodiment.

As illustrated in FIG. 7A, FIG. 7B, and FIG. 8, the fuel supply guide 55 according to the second embodiment also includes the support member 56 disposed near an upper portion of the fuel tank T1, and a body member 57 projecting in an inclined direction in which the body member 57 is shifted in a direction (rearward) away from the fuel supply port T1a as the body member 57 extends upward from the support member 56.

In the second embodiment, the body member 57 is supported by the support member 56 to be shiftable between a usage position Y1 (refer to FIG. 7A and FIG. 7B) for placing the fuel supply tank 54 thereon and a storage position Y2 (refer to FIG. 9) in which the body member 57 extends along the side surfaces (vertical surfaces 53) of the fuel tank T1 extending in the up-down direction. The body member 57 is in the usage position Y1 when the fuel supply guide 55 is used, and the body member 57 is in the storage position Y2 when the fuel supply guide 55 is not used.

In the second embodiment, the support member 56 is disposed along the vertical surfaces 53 of the fuel tank T1 to extend in the up-down direction. Specifically, the support member 56 includes a first support member 60L disposed near and leftward of a rear portion of the first vertical surface 53a to extend along the first vertical surface 53a, and a second support member 60R disposed near and rightward of a rear portion of the first vertical surface 53a to extend along the second vertical surface 53b. The first support member 60L and the second support member 60R are each formed of a plate material.

The first support member 60L includes a first portion 60a extending in the up-down direction, a second portion 60b extending in the up-down direction and positioned rearward of the first portion 60a with a space therebetween, a third portion 60c connecting lower end portions of the first portion 60a and the second portion 60b to each other, and a fourth portion 60d projecting forward from an upper portion of the first portion 60a.

The second support member 60R is formed similarly to the first support member 60L. That is, the second support member 60R also includes the first portion 60a, the second portion 60b, the third portion 60c, and the fourth portion 60d that are the same as those of the first support member 60L.

The first support member 60L and the second support member 60R are coupled to each other by a plurality of coupling members 61 (a first coupling plate 61A, a second coupling plate 61B, a third coupling plate 61C, and fourth coupling plate 61D). The first coupling plate 61A to the fourth coupling plate 61D are each formed of a band plate material extending in the machine-body width direction K2. The first coupling plate 61A couples upper portions of the first portion 60a of the first support member 60L and the first portion 60a of the second support member 60R to each other. The second coupling plate 61B couples upper portions of the second portion 60b of the first support member 60L and the second portion 60b of the second support member 60R to each other. The third coupling plate 61C couples, below the fourth portion 60d, intermediate portions of the first portion 60a of the first support member 60L and the first portion 60a of the second support member 60R to each other. The fourth coupling plate 61D couples lower end portions of the first support member 60L and the second support member 60R to each other.

Figure 9:
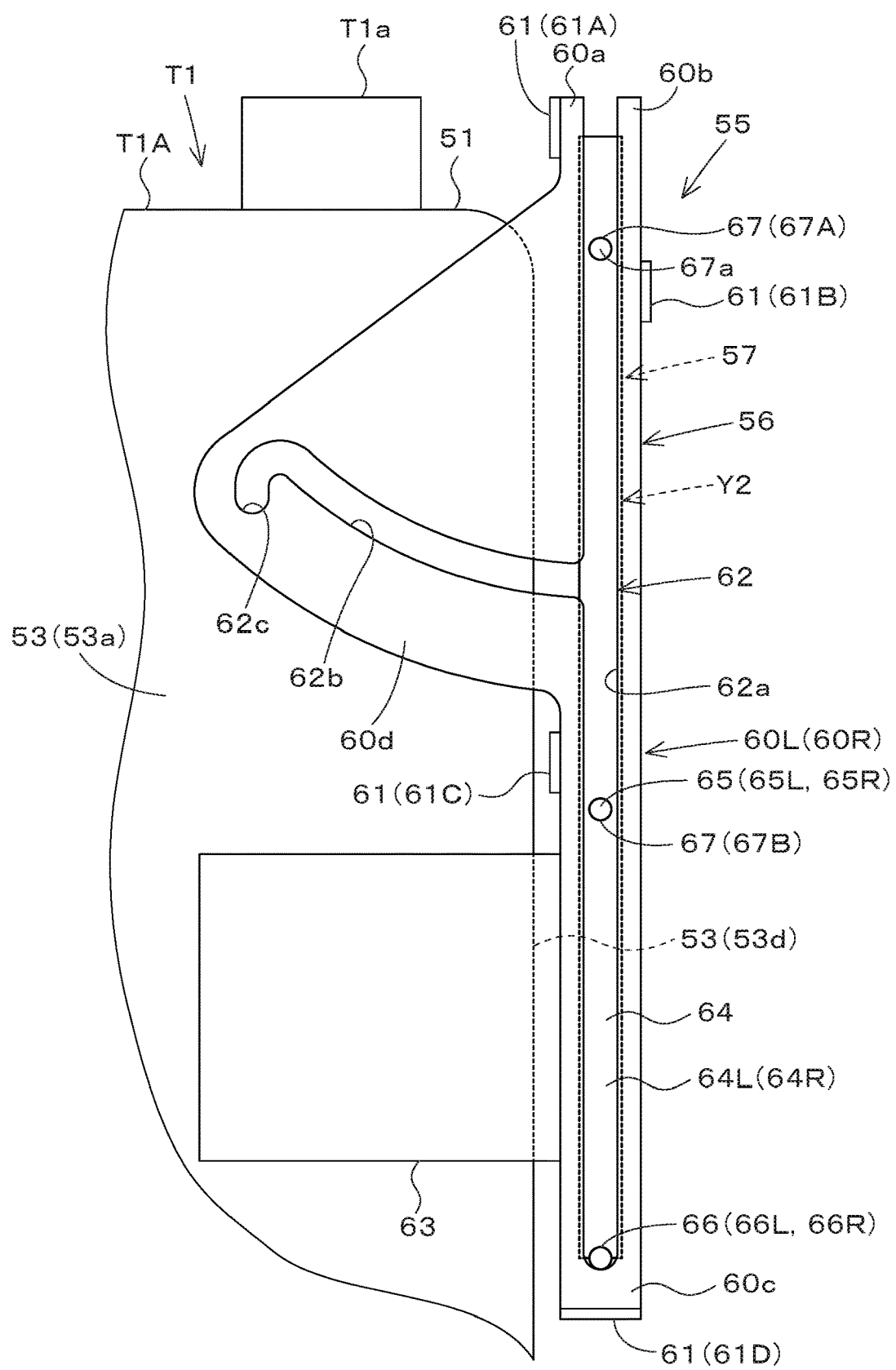
FIG. 9 is a side view of the fuel supply guide in a storage position according to the second embodiment.

As illustrated in FIG. 7B and FIG. 9, the support member 56 (the first support member 60L and the second support member 60R) has a guide groove 62 that guides the body member 57 so as to be shiftable between the usage position Y1 and the storage position Y2.

The guide groove 62 has a first groove 62a, a second groove 62b, and a third groove 62c.

The first groove 62a is a linear groove including the first portion 60a, the second portion 60b, and the third portion 60c and extending in the up-down direction. The first groove 62a is open to both sides in the machine-body width direction K2. Upper portions of the first portion 60a and the second portion 60b are not connected to each other. In other words, the first groove 62a is open upward. A bottom portion of the first groove 62a is closed by the third portion 60c.

The second groove 62b is formed at the fourth portion 60d. The second groove 62b is an arc-shaped groove branched from an intermediate portion of the first groove 62a in the up-down direction. Specifically, the second groove 62b is an arc-shaped groove curved downward in a protruding shape. One end of the second groove 62b is continuous (in communication) with the first groove 62a. The second groove 62b has an inclined shape in which the second groove 62b is shifted upward as the second groove 62b extends forward from one end to the other end thereof.

The third groove 62c is formed continuously from the other end of the second groove 62b. Specifically, the third groove 62c is formed to extend downward from the other end (upper end) of the second groove 62b, and the connection portion between the second groove 62b and the third groove 62c protrudes upward.

Also in the second embodiment, an example in which the first support member 60L and the second support member 60R are attached to a bracket member 63 fixed to the fuel tank T1 is presented.

As illustrated in FIG. 7B and FIG. 8, the body member 57 includes a main member 64 formed of a long plate material (long material), a first engagement portion 65 provided at an intermediate portion in the longitudinal direction of the main member 64, and a second engagement portion 66 provided close to an end in the longitudinal direction of the main member 64. The main member 64 includes a first member 64L supported by the first support member 60L, and a second member 64R supported by the second support member 60R. The first member 64L is disposed on the fuel tank T1 side (the right surface side) of the first support member 60L. The second member 64R is disposed on the fuel tank T1 side (the left surface side) of the second support member 60R. The first member 64L and the second member 64R are disposed parallel to each other with a space therebetween. One end portions of the first member 64L and the second member 64R in the longitudinal direction are coupled to each other by a first coupling rod 67A (coupling member 67) that serves as a placement portion for placing the fuel supply tank 54 thereon. Intermediate portions of the first member 64L and the second member 64R in the longitudinal direction are coupled to each other by a second coupling rod 67B (coupling member 67).

The first engagement portion 65 includes a first projecting portion 65L, which is a portion of the second coupling rod 67B projecting from the first member 64L, and a second projecting portion 65R, which is a portion of the second coupling rod 67B projecting from the second member 64R. The second engagement portion 66 includes a first pin 66L fixed to the other end side of the first member 64L in the longitudinal direction, and a second pin 66R fixed the other end side of the second member 64R in the longitudinal direction.

In the aforementioned second embodiment, as illustrated in FIG. 9, the body member 57 (main member 64) in the storage position Y2 is disposed to extend (such that the longitudinal direction thereof coincides with the up-down direction) along the first groove 62a in the up-down direction. When the body member 57 is in the storage position Y2, an end portion 67a of the first coupling rod 67A, the first engagement portion 65, and the second engagement portion 66 are fitted to the first groove 62a and movable in the up-down direction in the first groove 62a. When the body member 57 is in the storage position Y2, the end portion of the first coupling rod 67A is positioned at an upper portion of the first groove 62a, the first engagement portion 65 is positioned at an intermediate portion of the first groove 62a and below the second groove 62b, and the second engagement portion 66 is positioned at the lower end of the first groove 62a.

The main member 64 (body member 57) is shifted from the storage position Y2 to the usage position Y1 by moving the first engagement portion 65 and the second engagement portion 66 upward along the first groove 62a and then moving the second engagement portion 66 along the second groove 62b by rotating the main member 64 around the first engagement portion 65.

The shift from the storage position Y2 to the usage position Y1 will be described in detail. First, when the body member 57 (main member 64) in a state of being in the storage position Y2 is pulled upward, by holding the first coupling rod 67A, to move the second engagement portion 66 to a position near one end of the second groove 62b, the end portion 67a of the first coupling rod 67A is extracted upward from the upper end of the first groove 62a, and the first engagement portion 65 is positioned at an upper portion of the first groove 62a. In this state, when an upper portion of the body member 57 is pulled rearward and downward, the second engagement portion 66 is inserted into the second groove 62b from one end. Consequently, rotation of the body member 57 around the first engagement portion 65 is allowed. In other words, the body member 57 (main member 64) rotates around the first engagement portion 65. Next, when the second engagement portion 66 has reached the other end (upper end) of the second groove 62b, the second engagement portion 66 is fitted to the third groove 62c by moving the body member 57 (main member 64) downward. Then, as illustrated in FIG. 7B, the body member 57 is in the usage position Y1, and rotation of the body member 57 around the first engagement portion 65 is restricted in the usage position Y1. Consequently, the body member 57 is held (locked) in the usage position Y1 and can support the fuel supply tank 54 sufficiently even when the fuel supply tank 54 is placed on the body member 57.

In the second embodiment, since the first portion 60a and the second portion 60b of the support member 56 are positioned rearward from the fuel tank T1, the fuel tank T1 and the weight 10 are disposed with a sufficient space therebetween in the front-rear direction K1 to an extent that the support member 56 can be disposed rearward of the fuel tank T1.

FIG. 10 to FIG. 14 illustrate a third embodiment of the fuel supply guide 55.

Figure 10:
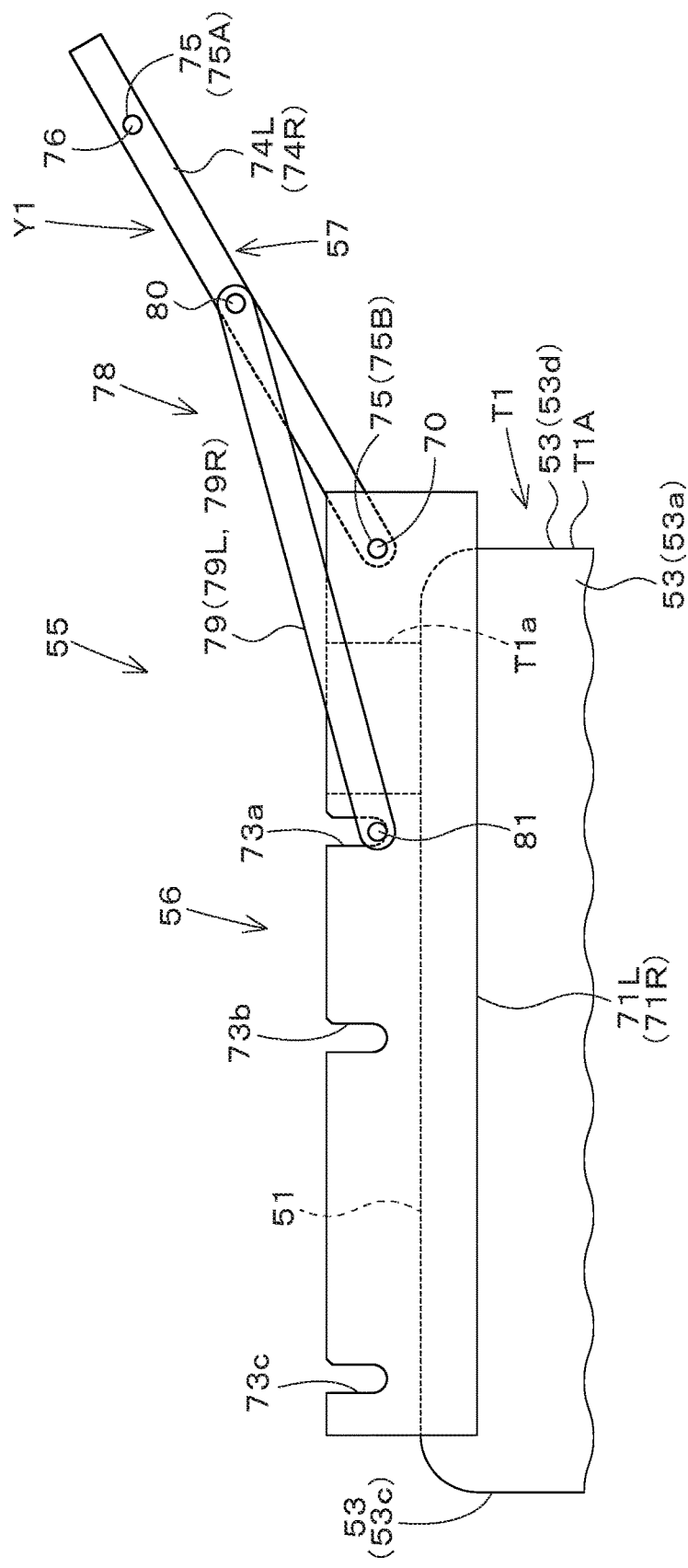
FIG. 10 is a side view of a fuel supply guide in a usage position according to a third embodiment.
Figure 11:
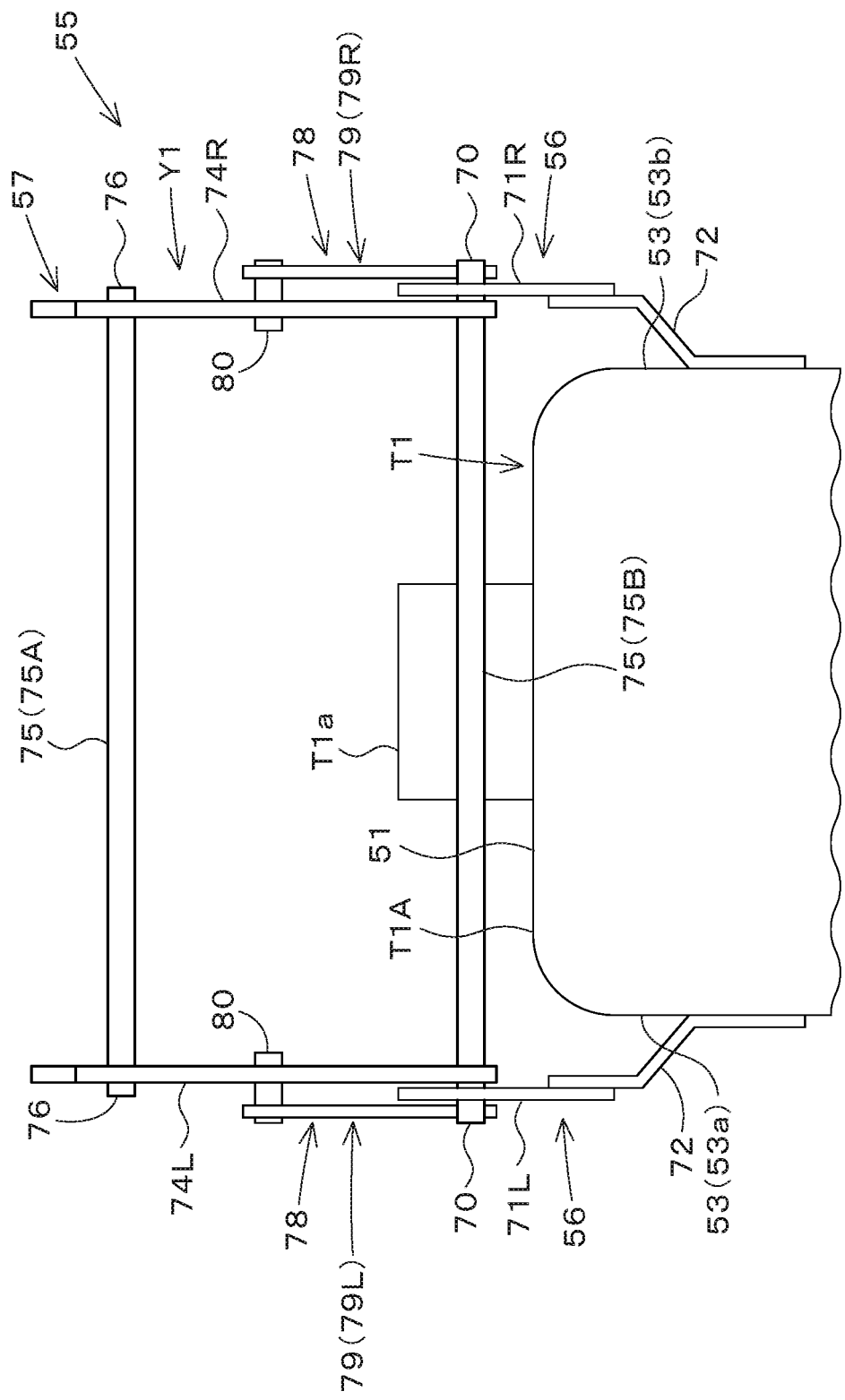
FIG. 11 is a rear view of the fuel supply guide in the usage position according to the third embodiment.
Figure 12:
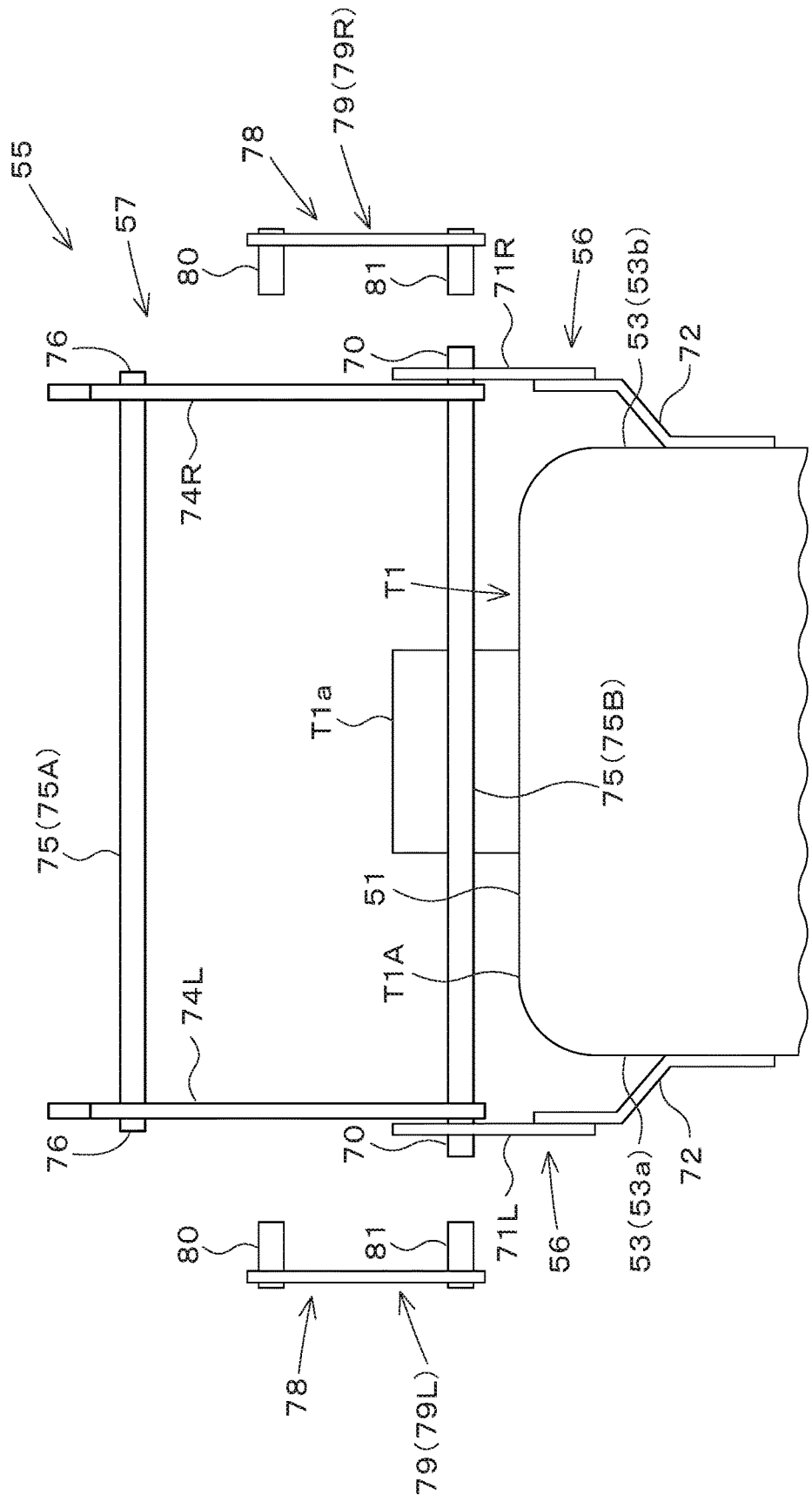
FIG. 12 is an exploded rear view of the fuel supply guide according to the third embodiment.

As illustrated in FIG. 10, FIG. 11, and FIG. 12, the fuel supply guide 55 according to the third embodiment also includes the support member 56 provided on an upper portion of the fuel tank T1, and a body member 57 projecting from the support member 56 in an inclined direction in which the body member 57 is shifted in a direction (rearward) away from the fuel supply port T1a as the body member 57 extends upward.

In the third embodiment, the body member 57 is supported by the support member 56 to be shiftable between the usage position Y1 (refer to FIG. 10) for placing the fuel supply tank 54 thereon and the storage position Y2 (refer to FIG. 13) in which the body member 57 is in a position at an upper portion of the fuel tank T1 and extends in the horizontal direction.

Figure 13:
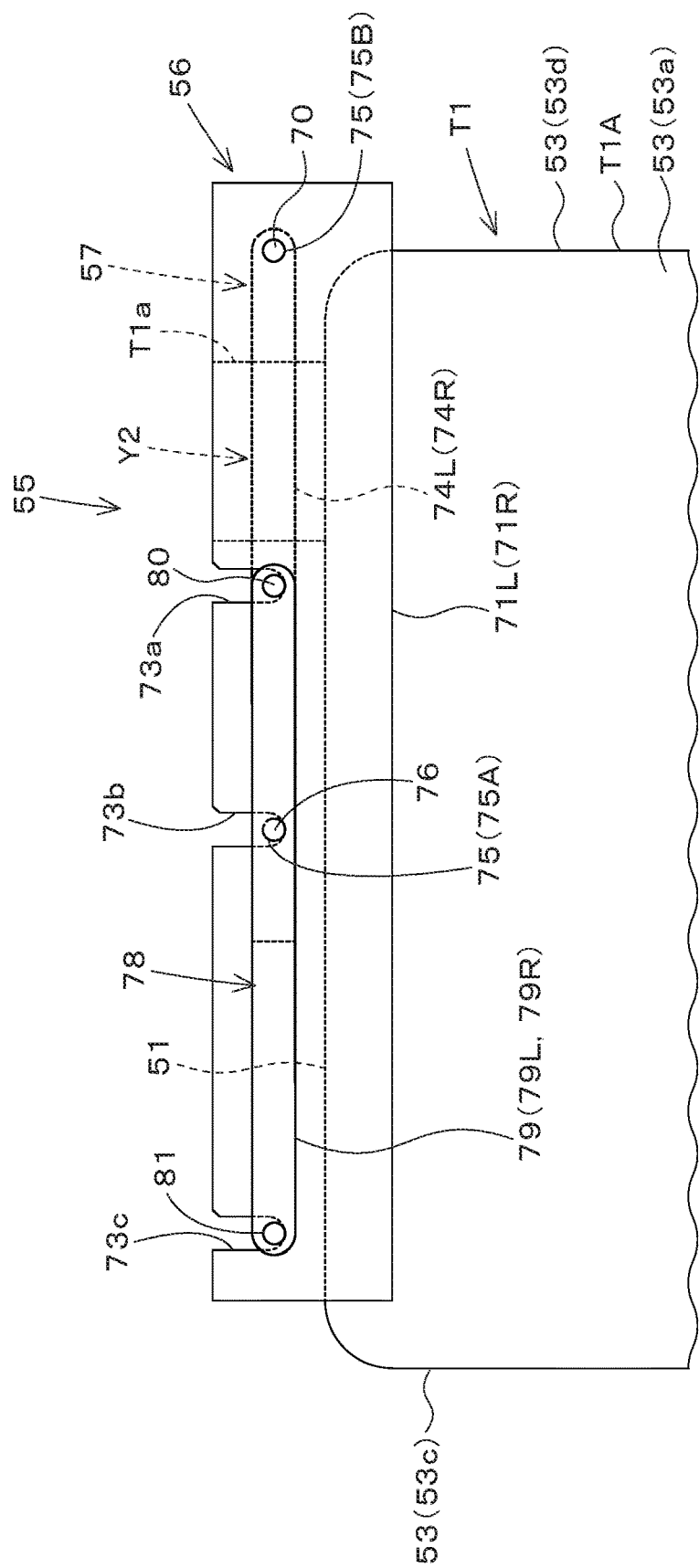
FIG. 13 is a side view of the fuel supply guide in a storage position according to the third embodiment.

As illustrated in FIG. 10 and FIG. 13, the support member 56 is formed of a plate material and is disposed at an upper portion of the fuel tank T1 to extend in the front-rear direction K1 (horizontal direction). The body member 57 includes a pivotally supported portion 70 pivotally supported by a rear portion (one end portion in the horizontal direction) of the support member 56 in the front-rear direction K1. The body member 57 is shiftable between the usage position Y1 and the storage position Y2 by rotating the body member 57 around the pivotally supported portion 70.

The support member 56 includes a first support member 71L disposed leftward of an upper portion of the first vertical surface 53a of the fuel tank T1 to extend in the front-rear direction K1, and a second support member 71R disposed rightward of an upper portion of the second vertical surface 53b of the fuel tank T1 to extend in the front-rear direction K1.

As illustrated in FIG. 11 and FIG. 12, an example in which the first support member 71L and the second support member 71R are attached to a bracket member 72 fixed to the fuel tank T1 is presented also in the third embodiment.

As illustrated in FIG. 10, the support member 56 (the first support member 71L and the second support member 71R) has a first locking groove 73a, a second locking groove 73b, and a third locking groove 73c. The first locking groove 73a, the second locking groove 73b, and the third locking groove 73c are formed to extend downward from the upper end of the support member 56 to an intermediate portion of the support member 56 in the up-down direction. That is, the first locking groove 73a, the second locking groove 73b, and the third locking groove 73c are grooves that open upward and open to both sides in the machine-body width direction K2. The first locking groove 73a is formed to be spaced forward (toward the other end of the support member 56 in the horizontal direction) from the pivotally supported portion 70. The second locking groove 73b is formed to be spaced forward from the first locking groove 73a. The third locking groove 73c is formed to be spaced forward from the second locking groove 73b.

As illustrated in FIG. 11 and FIG. 12, the body member 57 includes a first member 74L pivotally supported by the first support member 71L, a second member 74R pivotally supported by the second support member 71R, and a coupling member 75 that couples the first member 74L and the second member 74R to each other. The first member 74L and the second member 74R are each formed of a long plate material (long material). The first member 74L and the second member 74R are disposed parallel to each other with a space therebetween.

As illustrated in FIG. 12, the coupling member 75 includes a first coupling rod 75A that couples one end portions of the first member 74L and the second member 74R in the longitudinal direction to each other, and a second coupling rod 75B that couples the other end portions of the first member 74L and the second member 74R in the longitudinal direction to each other. Each end portion of the second coupling rod 75B serves as the pivotally supported portion 70 that pivotally supports the body member 57 at the support member 56. Specifically, one end portion of the second coupling rod 75B serves as the pivotally supported portion 70 that pivotally supports the first member 74L at the first support member 71L, and the other end portion of the second coupling rod 75B serves as the pivotally supported portion 70 that pivotally supports the second member 74R at the second support member 71R. The first coupling rod 75A is a placement portion for placing the fuel supply tank 54 thereon. One end portion and the other end portion of the first coupling rod 75A each serve as a first locking portion 76 that can be fitted to the second locking groove 73b. The first locking portion 76 is provided at an end portion of the body member 57 opposite to an end portion thereof provided with the pivotally supported portion 70.

As illustrated in FIG. 10, the fuel supply guide 55 according to the third embodiment includes a lock member 78 that locks the body member 57 in the usage position Y1.

When the body member 57 is in the usage position Y1, the lock member 78 is bridged over the body member 57 and the support member 56 and locks the body member 57 in the usage position Y1.

Specifically describing the lock member 78, as illustrated in FIG. 10, FIG. 11, and FIG. 12, the lock member 78 includes a body plate 79 formed of a long plate material, a pivotally attached portion 80 provided at one end portion of the body plate 79 in the longitudinal direction, and a second locking portion 81 provided at the other end portion of the body plate 79 in the longitudinal direction. The pivotally attached portion 80 and the second locking portion 81 are each formed of a pin. The pivotally attached portion 80 is pivotally attached to an intermediate portion of the body member 57 in the longitudinal direction. The lock member 78 is thus rotatable around the pivotally attached portion 80 with respect to the body member 57.

As illustrated in FIG. 11 and FIG. 12, the body plate 79 of the lock member 78 includes a first plate member 79L pivotally attached to the first member 74L, and a second plate member 79R pivotally attached to the second member 74R. The first plate member 79L and the second plate member 79R are each provided with the pivotally attached portion 80 and the second locking portion 81.

As illustrated in FIG. 13, when the body member 57 is in the storage position Y2, the body member 57 is disposed in a state of extending, between the first support member 71L and the second support member 71R, along the support member 56 in the front-rear direction K1. The first locking portion 76 is fitted to the second locking groove 73b. Specifically, the first locking portion 76 of the first member 74L is fitted to the second locking groove 73b of the first support member 71L, and the first locking portion 76 of the second member 74R is fitted to the second locking groove 73b of the second support member 71R. Consequently, the body member 57 is held in the storage position Y2.

The lock member 78 is disposed at the same height position as the height position of the body member 57 to extend in the front-rear direction K1. The pivotally attached portion 80 is fitted to the first locking groove 73a, and the second locking portion 81 is fitted to the third locking groove 73c. Specifically, the pivotally attached portion 80 of the first plate member 79L is fitted to the first locking groove 73a of the first support member 71L, and the second locking portion 81 of the first plate member 79L is fitted to the third locking groove 73c of the first support member 71L. The pivotally attached portion 80 of the second plate member 79R is fitted to the first locking groove 73a of the second support member 71R, and the second locking portion 81 of the second plate member 79R is fitted to the third locking groove 73c of the second support member 71R.

Figure 14:
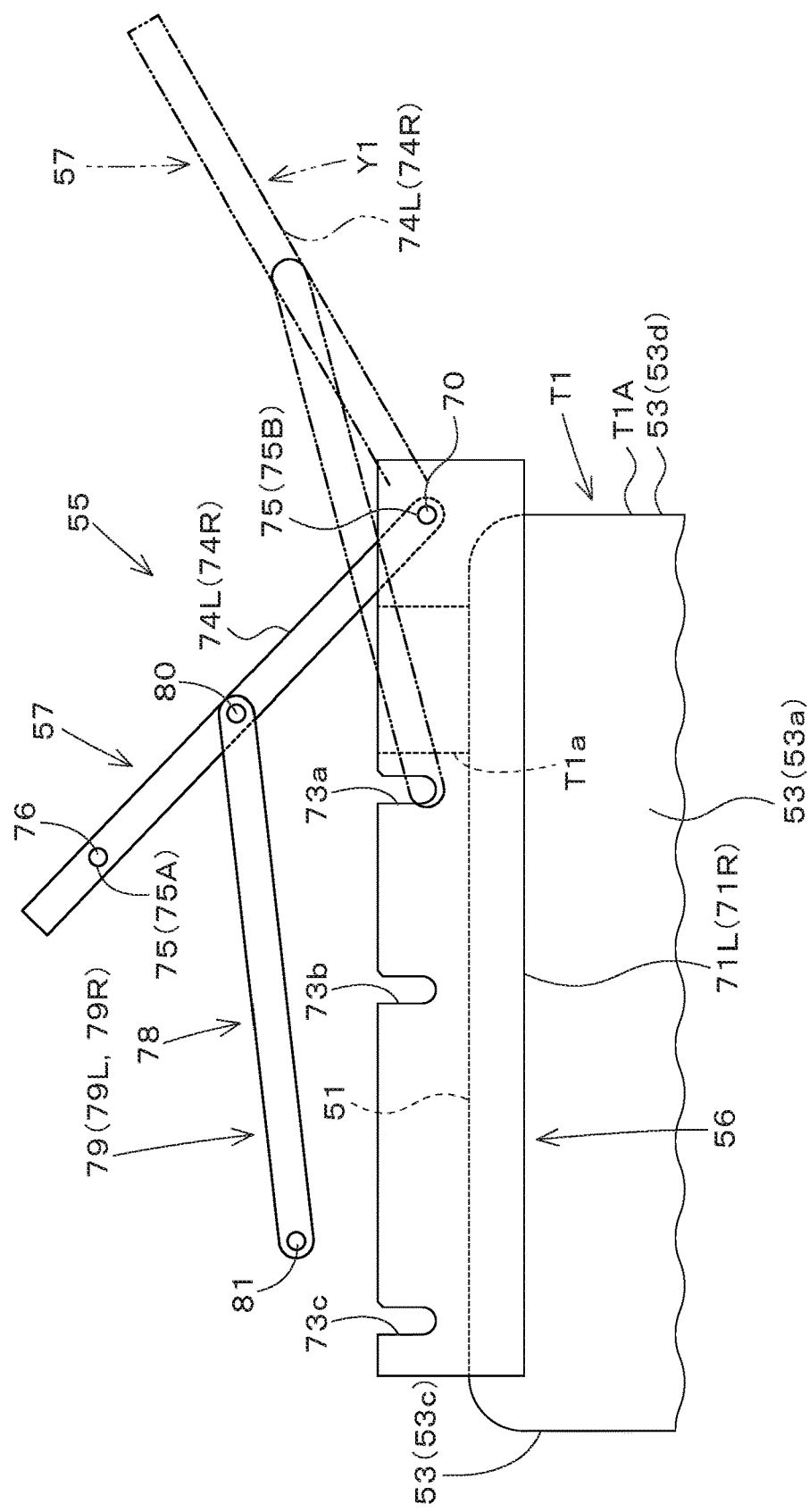
FIG. 14 is a side view of the fuel supply guide in a position between the storage position and the usage position according to the third embodiment.

To shift the body member 57 from the storage position Y2 to the usage position Y1, first, in the state in which the body member 57 is in the storage position Y2, the body member 57 is rotated upward as indicated by the solid lines in FIG. 14 around the pivotally supported portion 70, the pivotally attached portion 80 is disengaged from the first locking groove 73a, and the second locking portion 81 is disengaged from the third locking groove 73c. Next, as indicated by the two-dot-chain lines, the body member 57 is rotated to a position (usage position Y1) in which the second locking portion 81 is fitted to the first locking groove 73a, and the second locking portion 81 is fitted to the first locking groove 73a in the state in which the body member 57 is in the usage position Y1. As illustrated in FIG. 10, as a result of the second locking portion 81 being fitted to the first locking groove 73a, the rotation of the body member 57 around the pivotally supported portion 70 is restricted, and the body member 57 is locked in the usage position Y1.

In the present embodiment, the first vertical surface 53a of the fuel tank T1 is the left surface, and the second vertical surface 53b thereof is the right surface. However, when the place where the fuel tank T1 is installed is different depending on a working machine on which the fuel tank T1 is mounted, the first vertical surface 53a and the second vertical surface 53b of the fuel tank T1 may be the front surface and the rear surface, respectively, the first vertical surface 53a and the second vertical surface 53b thereof may be the rear surface and the front surface, respectively, or the first vertical surface 53a and the second vertical surface 53b thereof may be the right surface and the left surface, respectively. In other words, although the direction in which the fuel supply guide 55 projects is rearward in the present embodiment, the direction in which the fuel supply guide 55 projects may be forward, leftward, or rightward depending on a place where the fuel tank T1 is installed.

The aforementioned fuel supply guide 55 is to be used to supply a fuel by using the fuel supply tank 54 to the fuel tank T1 that includes the tank body T1A for storing the fuel and the fuel supply port T1a on the upper side of the tank body T1A. The fuel supply guide 55 includes the support member 56 provided on an upper portion of the fuel tank T1, and the body member 57 that projects from the support member 56 in a direction away from the fuel supply port T1a as the body member 57 extends upward and that projects higher than the fuel supply port T1a. The body member 57 is capable of receiving the fuel supply tank 54 by an upper portion thereof to support the fuel supply tank 54.

According to this configuration, it is possible, when transferring a fuel from the fuel supply tank 54 to the fuel tank T1, to perform work of supplying the fuel while the fuel supply tank 54 is received by the body member 57 of the fuel supply guide 55. Consequently, it is possible to ease the work of transferring the fuel.

The body member 57 is attachable to and detachable from the support member 56.

According to this configuration, the body member 57 can be dismounted and stored when not in use.

The support member 56 includes the first support member 56L closer to the first vertical surface 53a of the fuel tank T1 extending in the up-down direction, and the second support member 56R closer to the second vertical surface 53b of the fuel tank T1 opposite to the first vertical surface 53a. The body member 57 includes the first member 57L inserted into the first support member 56L in an insertable/extractable manner, the second member 57R inserted into the second support member 56R in an insertable/extractable manner, and the coupling member 59 coupling the first member 57L and the second member 57R to each other.

According to this configuration, it is possible to constitute the fuel supply guide 55 with a simple configuration.

The body member 57 is supported by the support member 56 to be shiftable between the usage position Y1 for placing the fuel supply tank 54 thereon and the storage position Y2 in which the body member 57 faces a surface of the fuel tank T1 extending in the up-down direction.

According to this configuration, the body member 57 can be compactly stored when not in use.

The support member 56 has the guide groove 62 along the vertical surfaces 53 of the fuel tank T1 extending in the up-down direction. The guide groove 62 guides the body member 57 to be shiftable between the usage position Y1 and the storage position Y2.

According to this configuration, it is possible to shift the body member 57 between the usage position Y1 and the storage position Y2 by operating the body member 57 along the guide groove 62 and possible to easily shift the body member 57.

The body member 57 includes the main member 64 formed of a long material, the first engagement portion 65 provided at an intermediate portion in the longitudinal direction of the main member 64, and the second engagement portion 66 provided closer to an end in the longitudinal direction of the main member 64. In the state of being in the storage position Y2, the body member 57 is disposed with the longitudinal direction of the main member 64 coinciding with the up-down direction such that the second engagement portion 66 is positioned below the first engagement portion 65. The guide groove 62 has the first groove 62a that guides the first engagement portion 65 and the second engagement portion 66 so as to be movable in the up-down direction, and the second groove 62b that is branched from an intermediate portion of the first groove 62a to guide the second engagement portion 66. The main member 64 is shifted to the usage position Y1 from the storage position Y2 by moving the first engagement portion 65 and the second engagement portion 66 upward along the first groove 62a and then moving the second engagement portion 66 along the second groove 62b by rotating the main member 64 around the first engagement portion 65.

According to this configuration, it is possible to easily change the position of the body member 57 to the usage position Y1 by simply pulling the body member 57 upward from the storage position Y2 and rotating the body member 57.

The guide groove 62 has the third groove 62c that holds the main member 64 in the usage position Y1 as a result of the second engagement portion 66 being fitted to the third groove 62c when the main member 64 is in the usage position Y1.

According to this configuration, it is possible to hold the body member 57 in the usage position Y1.

The body member 57 is supported by the support member 56 to be shiftable between the usage position Y1 for placing the fuel supply tank 54 thereon and the storage position Y2 in which the body member 57 is in a position at an upper portion of the fuel tank T1 and extends in the horizontal direction.

According to this configuration, the body member 57 can be compactly stored when not in use.

In addition, the lock member 78 that locks the body member 57 is included. The support member 56 is disposed at an upper portion of the fuel tank T1 to extend in the horizontal direction. The body member 57 includes the pivotally supported portion 70 pivotably supported by one end portion of the support member 56 in the horizontal direction. The body member 57 is shiftable between the usage position Y1 and the storage position Y2 by rotating the body member 57 around the pivotally supported portion 70. When the body member 57 is in the usage position Y1, the lock member 78 is bridged over the body member 57 and the support member 56 and locks the body member 57 in the usage position Y1.

According to this configuration, by simply rotating the body member 57 around the pivotally supported portion 70, it is possible to easily shift the body member 57 between the usage position Y1 and the storage position Y2.

The support member 56 has the first locking groove 73a formed to be spaced from the pivotally supported portion 70 toward the other end of the support member 56 in the horizontal direction, the second locking groove 73b formed to be spaced from the first locking groove 73a toward the other end, and the third locking groove 73c formed to be spaced from the second locking groove 73b toward the other end. The body member 57 includes the first locking portion 76 provided at an end portion thereof opposite to an end portion thereof provided with the pivotally supported portion 70. The lock member 78 includes the pivotally attached portion 80 that is provided closer to one end thereof and that is pivotally attached to an intermediate portion of the body member 57, and the second locking portion 81 that is provided closer to the other end thereof and that is to be fitted to the first locking groove 73a when the body member 57 is in the usage position Y1 to lock the body member 57 in the usage position Y1. When the body member 57 is in the storage position Y2, the pivotally attached portion 80 is fitted to the first locking groove 73a, the first locking portion 76 is fitted to the second locking groove 73b, and the second locking portion 81 is fitted to the third locking groove 73c.

According to this configuration, it is possible to compactly store the body member 57 and the lock member 78.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel supply guide to be used to supply a fuel by using a fuel supply tank comprising:
    a support member provided on an upper portion of a fuel tank including a tank body to store the fuel and a fuel supply port on an upper side of the tank body;
    a body member projecting from the support member in a direction away from the fuel supply port as the body member extends upward and projecting higher than the fuel supply port, the body member being capable of receiving the fuel supply tank at an upper portion thereof to support the fuel supply tank; and
    a bracket member directly fixed to the tank body of the fuel tank, wherein
    the support member is attached to the bracket member, and
    the support member includes a first support member closer to a first vertical surface of the fuel tank extending in an up-down direction, and a second support member closer to a second vertical surface of the fuel tank opposite to the first vertical surface.

2. The fuel supply guide according to claim 1, wherein the body member is attachable to and detachable from the support member.

3. A working machine comprising the fuel supply guide according to claim 1.

4. The fuel supply guide according to claim 1, wherein the body member is supported by the support member to be shiftable between a usage position for placing the fuel supply tank thereon and a storage position in which the body member faces a surface of the fuel tank extending in an up-down direction.

5. The fuel supply guide according to claim 4, wherein the support member has a guide groove along a vertical surface of the fuel tank extending in the up-down direction, the guide groove guiding the body member to be shiftable between the usage position and the storage position.

6. The fuel supply guide according to claim 5, wherein the body member includes a main member formed of a long material, a first engagement portion provided at an intermediate portion in a longitudinal direction of the main member, and a second engagement portion provided closer to an end in the longitudinal direction of the main member, and the body member is disposed with the longitudinal direction of the main member coinciding with the up-down direction such that the second engagement portion is positioned below the first engagement portion in a state of being in the storage position, the guide groove has a first groove to guide the first engagement portion and the second engagement portion to be movable in the up-down direction, and a second groove branched from an intermediate portion of the first groove to guide the second engagement portion, and the main member is shifted from the storage position to the usage position by moving the first engagement portion and the second engagement portion upward along the first groove, and then moving the second engagement portion along the second groove by rotating the main member around the first engagement portion.

7. The fuel supply guide according to claim 6, wherein the guide groove has a third groove to hold the main member in the usage position as a result of the second engagement portion being fitted to the third groove when the main member is in the usage position.

8. The fuel supply guide according to claim 1, wherein the body member is supported by the support member to be shiftable between a usage position for placing the fuel supply tank thereon and a storage position in which the body member is in a position at an upper portion of the fuel tank and extends in a horizontal direction.

9. The fuel supply guide according to claim 8, comprising:
a lock member to lock the body member, wherein
the support member is disposed at an upper portion of the fuel tank 5 in the horizontal direction,
the body member includes a pivotally supported portion pivotally supported by one end portion of the support member in the horizontal direction, the body member being shiftable between the usage position and the storage position by being rotated around the pivotally supported portion, and
the lock member is bridged over the body member and the support member and locks the body member in the usage position when the body member is in the usage position.

10. The fuel supply guide according to claim 9, wherein
the support member has a first locking groove formed to be spaced from the pivotally supported portion toward another end of the support member in the horizontal direction, a second locking groove formed to be spaced from the first locking groove toward the other end, and a third locking groove formed to be spaced from the second locking groove toward the other end,
the body member includes a first locking portion provided at an end portion thereof opposite to an end portion thereof provided with the pivotally supported portion,
the lock member includes a pivotally attached portion provided closer to one end thereof and pivotally attached to an intermediate portion of the body member, and a second locking portion provided closer to another end thereof and to be fitted to the first locking groove to lock the body member in the usage position when the body member is in the usage position, and
when the body member is in the storage position, the pivotally attached portion is fitted to the first locking groove, the first locking portion is fitted to the second locking groove, and the second locking portion is fitted to the third locking groove.

11. A fuel supply guide to be used to supply a fuel by using a fuel supply tank to a fuel tank that includes a tank body for storing the fuel and a fuel supply port on an upper side of the tank body, the fuel supply guide comprising:
a support member provided on an upper portion of the fuel tank; and
a body member projecting from the support member in a direction away from the fuel supply port as the body member extends upward and projecting higher than the fuel supply port, the body member being capable of receiving the fuel supply tank at an upper portion thereof to support the fuel supply tank, wherein
the support member includes a first support member closer to a first vertical surface of the fuel tank extending in an up-down direction, and a second support member closer to a second vertical surface of the fuel tank opposite to the first vertical surface, and
the body member includes a first member inserted into the first support member in an insertable/extractable manner, a second member inserted into the second support member in an insertable/extractable manner, and a coupling member to couple the first member and the second member to each other.

\* \* \* \* \*